Figure 1:
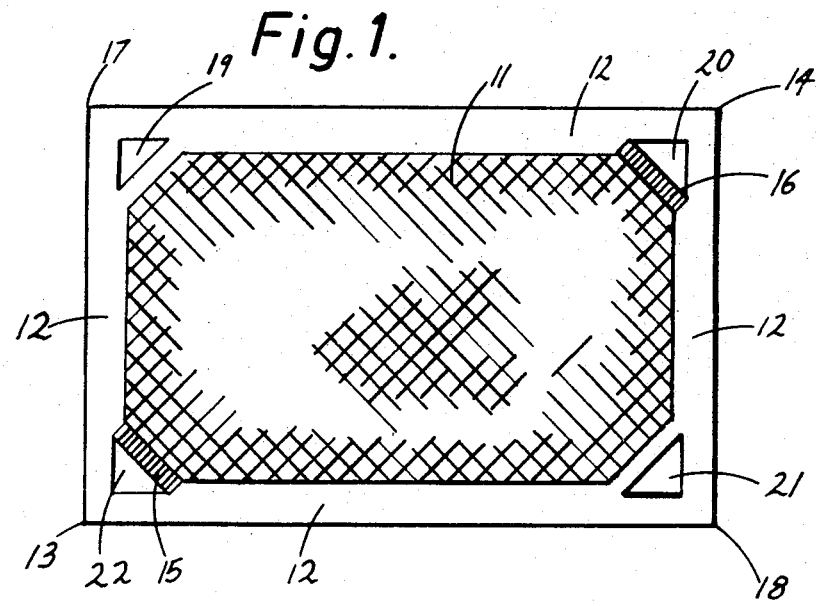

United States Patent

Wyatt et al.

[15] 3,679,059
[45] July 25, 1972

[54] MEMBRANE PACKS

[72] Inventors: James Andrew Stewart Wyatt; Clifford Victor Gascoyne Chapman; George Stefan Solt, all of Rickmansworth; Mullet, Sidney George, Chessington, all of England

[73] Assignee: William Boby & Company Limited, Rickmansworth, England

[22] Filed: July 28, 1969

[21] Appl. No.: 845,475

[52] U.S. Cl. ............................................. 210/321, 210/541
[51] Int. Cl. ......................................................... B01d 31/00
[58] Field of Search ...................... 210/22, 23, 321, 500, 541, 210/499, 495; 204/180 P, 301, 296; 264/273

[56] References Cited

UNITED STATES PATENTS

| | | | |
|---|---|---|---|
| 2,297,729 | 10/1942 | Thomas | 210/500 X |
| 2,758,083 | 8/1956 | Hoek et al. | 210/321 X |
| 3,412,006 | 11/1968 | Alexander et al. | 204/296 |
| 3,046,211 | 7/1962 | Tye | 204/301 X |

FOREIGN PATENTS OR APPLICATIONS

| | | | |
|---|---|---|---|
| 10,523 | 1/1903 | Austria | 210/321 |
| 1,123,296 | 2/1962 | Germany | 204/296 |

OTHER PUBLICATIONS

Cohan et al., " A Survey of Electrodialysis Developments in the United States," Proceedings of the First International Symposium on Water Desalination, held in Washington, D.C., Oct. 3– 9, 1965, received in Patent Office July 27, 1967, pages 390 and 395 relied on.

*Primary Examiner*—Frank A. Spear, Jr.
*Attorney*—Watson, Cole, Grindle & Watson

[57] ABSTRACT

A gasket separator unit, for membrane packs, used in processes involving membrane packs used in osmosis, dialysis, and electrodialysis, comprises a mesh around the peripheral area of which is formed a layer of gasket-forming material, embedded in the mesh, which forms a continuous surface on either side of the mesh.

10 Claims, 2 Drawing Figures

PATENTED JUL 25 1972

3,679,059

MEMBRANE PACKS

The invention relates to membrane packs. The present design of such packs which are used in processes involving dialysis, reverse osmosis, electrodialysis and similar processes, consists of cells each bounded by two membranes and sealed around their edges by separate gaskets made usually of rubber or plastics material.

Each membrane is generally separated from adjacent membranes by a permeable separator, usually consisting of a mesh.

The assembly of the pack requires the correct positioning relative to one another of the membranes, the separators and the gaskets. As would be expected, such assembly is facilitated by using units comprising a gasket and a separator which are preformed in one piece. The incorporation of such units into the pack not only reduces the cost of assembly, but also ensures that the correct relative positions of the two components are maintained during the operation of the pack and increases the pack's robustness. Some packs available at present, therefore, incorporate integrally moulded gasket separator units or units formed by cutting a suitable pattern from a sheet. Such units are, however, expensive to produce and do not permit the use of different materials for the gasket part and the separator part of the unit.

According to the present invention there is provided a unit comprising a gasket and separator, for use in a membrane pack comprising alternate membranes and separators, which unit comprises a preformed mesh as hereinafter defined, having located in at least some part of the peripheral area thereof a gasket formed of a material embedded in the mesh and forming on that part of the peripheral area where it is located a substantially continuous planar surface on either side of the mesh. Preferably the material is located around the whole of the periphery of the mesh.

A gasket is thus formed around the edge of the separator mesh.

By the term "mesh" as used in this specification is meant any structure which, when in use, supports the membranes adjacent to it and keeps them a substantially uniform distance apart, allows liquid to flow in a longitudinal direction and, in the case where the pack is to be used in electrodialysis electrical current to flow through the liquid in a transverse direction. The term "mesh" may therefore include woven materials, extruded meshes (e.g. that sold under the name "Netlon"), corrugated perforated sheets of, for example, plastics, expanded plastic sheet (e.g. that sold under the trade name "Exbex") and sintered sheets of solid particles of for example metals, glass or plastics materials.

The material located in the peripheral area of the mesh may be any suitable non-porous material capable of forming an adequate seal which does not deform or decompose during the operation of the pack. In the case of use in electrodialysis, the material should resist corrosive conditions and should remain electrically insulating. Desirably it is a plastics material which will set or harden, or can be caused to set or harden, for example, by heat-curing once in position. Clearly, the conditions required to set or harden the material must not be such as will damage the remainder of the structure. Polyurethane, polyester/polyurethane compounds and low-temperature cured rubbers are preferred, but wax, cement, pitch, plaster of paris, bitumen, epoxy resins, setting rubbers (e.g. silicone rubbers), soft flowing plastics, thermoplastics or solvent carried materials could for example be used. The thickness and surface of the layer of material so formed should be such that, when the pack is assembled and in operation, the material forms a fluid-tight seal with the membranes adjacent to it.

The gasket separator units may conveniently be formed in large numbers by assembling a pile of meshes of the correct size each separated from its neighbors by either a sheet of membrane material, or, since membrane material is generally expensive, by a sheet of some other material which is cheap and sufficiently robust. An example of such a material is polyethylene sheet or, preferably, a sheet of a metal such as aluminium. It is of course most desirable that there is substantially no adhesion between the settable material and the sheet inserted between the separators. Release agents e.g. silicone release agents may be employed in this connection to reduce adhesion, if found necessary.

The pile may be pressed together to ensure that the sheet is uniformly in contact with the mesh, immersed in a bath of the gasket-forming material in liquid form and the material allowed to penetrate the meshes. On being allowed to set, the material takes the thickness of the mesh and forms the gasket part of the unit. Alternatively the distance between the sheets, and hence the thickness of the layer of gasket-forming material, may be controlled by spacers inserted between the mesh and the sheet. Clearly, the number of separator-gasket units which can be formed simultaneously by this method may vary enormously. Indeed the units could be formed singly by this method.

After the material has been allowed to set, the separator gasket units may be separated from each other if desired.

The gasket-forming material should desirably be permitted to penetrate to a predetermined outline and the ingress of the material may be controlled by applying to each mesh a strip of blocking material along the desired line of maximum permissible ingress. Suitable materials for use as blocking materials should be nontoxic, innocuous to membranes, and either may be suitable for remaining in situ, or alternatively water soluble, so that the initial working of the pack will wash away the material. Suitable substances for use as blocking materials include, for example, polyethylene putty, carboxymethylcellulose, gelatine, starch past, p.v.a., a mixture of glycol and silica powder, strips of uncured rubber and even the gasket-forming material itself. The blocking material may also be formed by deforming the mesh itself along the desired line of maximum permissible ingress, the deformation being such as to arrest the flow of the gasket-forming material.

An alternative method of controlling the ingress of the gasket-forming material is by making up the liquid material to a carefully controlled viscosity, for example by the use of a suitable filler, i.e. a filler which does not adversely affect the necessary qualities of the gasket-forming material to any substantial degree, for example, silica dust. The viscous fluid may then be poured along the edges or edge parts of the mesh or meshes where a gasket is to be formed, at a controlled rate per unit length of edge so that the quantity of the liquid deposited on each edge or edge part is that necessary to form a gasket of the desired thickness and width. To this end a metering pump may be used to distribute the liquid gasket-forming material. On the application of pressure, any excess liquid will be squeezed out of the mesh, rather than towards the part of the mesh not covered by the liquid, owing to the lower resistance to flow where the mesh is absent.

It will be realized that there is no need for the mesh to extend through the whole width of the gasket. The mesh need only penetrate into the gasket a sufficient distance to ensure that the two parts of the assembly are mechanically held together by the bedding of the mesh into the gasket-forming material. Thus if the sheets extend beyond the edge of the mesh, liquid gasket-forming material can be caused to fill, or partly fill, the area beyond the edge of the mesh but bounded on two sides by the sheets, and so, after hardening, form a gasket only part of which is embedded in the mesh. Any excess may be squeezed outwards during the manufacture of the gasket separator assembly, and can, if desired, be trimmed off after solidifying. Where a blocking material is used to control the ingress of the gasket-forming liquid, further strips of material may be used to cordon off the area near the holes in the port pieces, so preventing them being blocked up by the liquid. Preferably, however, the liquid is permitted to contact the ends of the port pieces so as to secure the port pieces in position.

Generally each cell of the membrane pack has at least two ports, through at least one of which fluid can flow into the pack and through at least one of which fluid can flow out of the pack, when the pack is in use. In the case of packs having separator-gasket units according to the present invention the ports may be formed each of two strips of a plastics material such as polypropylene, one of which has a castellated or otherwise uneven surface on which surface is placed the other strip which is plane surfaced. Fluid may thus flow through the holes in the port pieces.

The port pieces, each of which should desirably be of substantially the same thickness as the gasket to be formed, may conveniently be inserted in holes, appropriately shaped and positioned, cut in the mesh. Clearly the ends of the port pieces should form a seal with the gasket forming material so as to ensure no leakage of liquid from the cell. It is preferred that the port pieces are positioned prior to gasket formation and that the gasket-forming material is used to secure the ends of the port piece. If ingress of the gasket-forming material is controlled by a strip of blocking material, a strip of the material may be used to prevent the holes of the port pieces becoming clogged with the material. Holes extending longitudinally through the pack may be bored so as to constitute manifolds communicating with the ports.

It is to be understood that the membrane packs comprising separator-gasket units in accordance with the invention are also within the scope of the invention.

Figure 2:
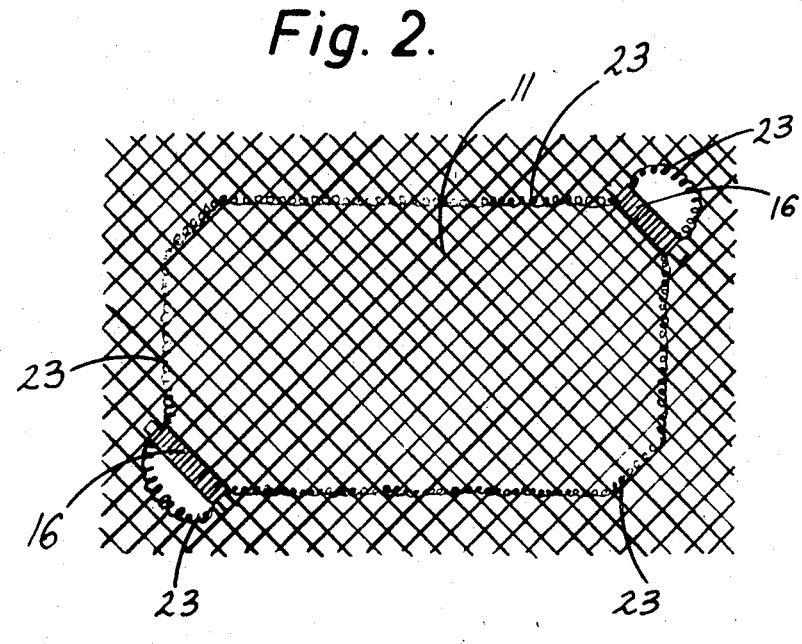

In order that the invention may be more clearly understood a specific embodiment thereof will now be described with reference to the accompanying drawings. In the drawings:

FIG. 1 shows in plan a gasket separator unit ready for use in a membrane pack, and FIG. 2 shows in plan the mesh of the gasket separator unit shown in FIG. 1 prior to the application of the liquid gasket-forming material together with the port pieces and blocking material in position.

The specific embodiment consists of a rectangular mesh 11, having embedded around its peripheral area a continuous layer of polyurethane 12. Across each of one pair of diagonally opposed corners 13,14 is located a port piece 15,16 respectively. Each port piece consists of two polypropylene strips one having a fluted surface on which the other, a plane surfaced strip is positioned. Each of the port pieces is located in a corresponding hole in the mesh 11 and is of substantially the same thickness as the mesh. To ensure correct positioning the port pieces may further comprise small projections at either end, which are located in corresponding holes in the mesh.

In the other two diagonally opposing corners 17,18 the polyurethane layer 12 is permitted to extend to the corresponding positions in relation to those corners as are occupied by the inner edge of the port pieces in relation to the other pair of corners 13,14.

Holes 19, 20, 21, 22 to form the necessary feed and drain manifolds are cut in the peripheral area, two of which, 20, 22 communicate with the holes in the port pieces 15, 16. The other two 19, 21 communicate with the cells adjacent to that cell enclosing mesh 11.

To form the specific embodiment, the mesh 11 is first out to the desired size and shape. The holes for locating the port pieces 15, 16 are also out in the mesh, and the port pieces inserted. A thin strip of blocking material, in this case polyethylene putty 23 is then applied to the mesh along the perimeter of maximum desired penetration of the gasket-forming material. The strip is embedded in the mesh and, when the mesh is positioned between the two membranes or membrane substitute sheets, forms a sufficient seal to prevent the relatively viscous gasket-forming liquid to pass through it. The strip 23 is such as to allow the gasket-forming liquid to contact the ends of the port pieces and any projections therefrom, but so as to prevent the liquid from entering or coming in contact with the holes in the port pieces. Clogging of the ports is thus prevented.

The pack of alternate separators and membrane or membrane-substitute sheets is assembled, and the polyurethane gasket-forming material introduced and allowed to set. Manifolds 19, 20, 21, 22 are then cut out.

A specific example of the use of the controlled viscosity method of gasket formation will now be described.

EXAMPLE

In a rectangular sheet of polyethylene mesh (diamond 1 mesh configuration 1.32 mm thick, trade name Netlon, supplied by Netlon Sales Ltd.) 54.5 cm wide and 155.0 cm long, two small rectangular holes were cut at two diagonally opposite corners. Two polypropylene flow ports were then inserted into the holes and bonded to the mesh by hot melt adhesive (Thermogrip 9410 supplied by Bostik Ltd.) applied to the components by a hot melt dispensing gun. The sheet of Netlon now fitted with flow ports was then placed into a rectangular frame just slightly larger in breadth and length than the sheet itself, and consisting essentially of a base with a 2.5 cm thick ridge running around its periphery.

300 g of hydroxylated polyester (Dobeckan LF 408 HT, supplied by Dr. Beck & Co. (England) Ltd.) was thoroughly mixed with 81 g of an aromatic isocyanate (Dobeckan Hardener IF 200, supplied by Dr. Beck & Co. (England) Ltd.) and 19 g of a finely divided silica (Aerosil 300, supplied by Degussa). The resultant mix was a smooth, highly viscous polyurethane paste. This paste was then applied to the sheet of polyethylene net by means of a 5 cm wide spatula, but was confined to a region of 5.25 cm width around the edge of the polyethylene net, accurate application being facilitated by use of straight pre-set guide bars. At the corners, the outline of the ingress of the paste is substantially as shown in FIG. 2 by the line of blocking material. Thus the paste is permitted to contact the ends of the port pieces, but not to contact the holes therein. The paste was spread in such a manner that no excess material protruded to a thickness greater than that of the mesh itself.

On completion of this pasting process, a sheet of polyethylene material was placed over the pasted area. Another sheet of Netlon, fitted with bonded-in flow port pieces, was placed on top of the polyethylene separator. A further batch of polyurethane was prepared as described above, and a similar pasting procedure employed in the application of the paste to this second Netlon sheet. Another polyethylene separator sheet was applied and the whole process repeated again. 10 such assemblies were completed before a solid lid was applied to the casting frame. To this lid was applied sufficient pressure to ensure that the correct thickness of the individual gaskets was obtained, this pressure being determined by trial and error.

The finished assembly was allowed to stand for 16 hours. During this time the polyurethane cured to the solid form. The lid was removed and the Netlon sheets with their integral solid polyurethane areas were separated one from another. They were subsequently trimmed to the correct size, viz. 152 × 52 cm and the flow channel areas in each corner — which had become covered or partially covered by polyurethane in the pasting process — were stamped out.

It will be clear that there are many variations which can be included in gasket separator units according to the present invention without departing from the scope of the invention. Many types of port piece are known and the number of ports may be varied. Such variations as are possible are known to those skilled in the art.

Gasket separator units produced by the process of the present invention are simple and robust in construction, by virtue of the integral nature of the unit. The process of the present invention may also result in considerable economies in production.

We claim:

1. An integral gasket and separator unit, for use in a membrane pack which unit comprises:
   a rectangular preformed mesh;
   a gasket formed of a material embedded in and enclosing the peripheral area of said mesh to the same thickness thereof;

two triangular holes formed in diagonally opposing corners of said rectangular preformed mesh;

a gasket material formed on two sides of said triangular holes;

port elements having the same thickness as said mesh for allowing the passage of fluid at a level intermediate the thickness of said mesh and bounding said two holes on the third sides thereof;

two additional holes formed in the remaining diagonally opposing corners of said rectangular mesh;

an additional gasket material surrounding said additional triangular holes and of the same thickness as said mesh.

2. An integral gasket and separator unit as in claim 1 wherein said gasket material is a member of the group consisting of a polyurethane, a polyester/polyurethane, low temperature rubber, wax, setting rubbers, soft flowing plastics and thermoplastics.

3. A gasket and separator unit as claimed in claim 1 wherein that part of the peripheral area of the mesh where the gasket is to be formed comprises a layer of a settable fluid material, said layer extending through the mesh, and thereafter causing the fluid material to set and to form said planar surface on either side of the mesh.

4. A gasket and separator unit as in claim 3 wherein the meshes to which the fluid material is applied are assembled in a pile in which each mesh is separated from adjacent meshes by a sheet member.

5. A gasket and separator unit as in claim 3 further comprising a blocking material for controlling the ingress of said gasket-forming material into the central area of the mesh, said blocking material is applied to each mesh as a strip along the line of maximum permissible ingress.

6. A gasket and separator unit as in claim 5 wherein said blocking material is a member from the group consisting of polyethylene putty, carboxymethyl cellulose, gelatin, starch paste, or p.v.a.

7. A gasket and separator unit as in claim 5 wherein said blocking material is constituted by strips of uncured rubber.

8. A gasket and separator unit as in claim 3 wherein said gasket-forming material is a hardened viscous liquid for controlling the ingress thereof into the central area of said mesh.

9. A gasket and separator unit as in claim 8 wherein said gasket-forming material includes a filler for controlling the viscosity thereof.

10. A gasket and separator unit as in claim 3 further comprising at least two port pieces inserted in said holes in said mesh and fixed in position by bonding with said gasket-forming material.

* * * * *